United States Patent [19]
Kelly et al.

[11] 3,851,110
[45] Nov. 26, 1974

[54] DIGITAL DIAL PULSE RECEIVER

[75] Inventors: Michael J. Kelly, Melrose Park; Charles J. Simon, Hinsdale, both of Ill.

[73] Assignee: GTE Automatic Electric Laboratories Incorporated, Northlake, Ill.

[22] Filed: Sept. 12, 1973

[21] Appl. No.: 396,624

[52] U.S. Cl. ........ 179/18 EB, 179/18 J, 179/15 BY
[51] Int. Cl. .............................................. H04j 3/12
[58] Field of Search .......... 179/18 EB, 15 BY, 18 J; 235/92 CC

[56] References Cited

UNITED STATES PATENTS

| | | | |
|---|---|---|---|
| 3,366,778 | 1/1968 | De Stefand | 179/18 EB |
| 3,686,443 | 8/1972 | Kavanaugh et al. | 179/15 BY |
| 3,686,634 | 8/1972 | Malchman et al. | 235/92 CC |
| 3,725,598 | 4/1973 | Braun et al. | 179/18 EB |
| 3,761,636 | 9/1973 | Stauers | 179/18 EB |

*Primary Examiner*—Kathleen H. Claffy
*Assistant Examiner*—Gerald L. Brigance
*Attorney, Agent, or Firm*—L. N. Arnold

[57] ABSTRACT

A digital dial pulse receiver circuit includes pulse detecting means for determining the on-hook off-hook supervisory status of a calling party line and providing corresponding on-hook off-hook pulses, respectively, counter means for separately counting the on-hook off-hook pulses and providing an output pulse to increment a dial pulse counter when a minimum number of on-hook pulses have occurred, another output pulse to reset the on-hook count state when a minimum number of off-hook pulses have occurred, still another output pulse to signal a calling party disconnect condition when a maximum number of on-hook pulses have occurred, and a further output pulse to signal the completion of the dialed digit when a maximum number of off-hook pulses have occureed. All counter means are reset upon the occurrence of either the disconnect signal or the digit completion signal.

8 Claims, 5 Drawing Figures

DIGITAL DIAL PULSE RECEIVER

This invention relates generally to digital signaling techniques in telephone communication systems including switching stations and more particularly relates to the receiving of digital code signals known as dial pulses employing receiver circuits.

In automatic (senderized non-step-by-step) distance dialing systems, dial pulsing or dial pulse signaling is a practiced means for transmitting and receiving dial pulse information between an automatic switching exchange or station and a subscriber apparatus. As is known for digital carrier systems, voice and supervisory data is carried in an eight bit multi-channel time multiplexed format having a predetermined time frame that is repeated approximately every 125 microseconds. In the operation of digital channel banks, a dc supervisory signal is inserted in the eighth bit of the eight bit format of a given channel to comprise a signaling bit for monitoring the on-hook off-hook status of a selected channel. In particular, the D2 carrier format presents a supervisory bit in the eighth bit position of the selected channel time slot of each sixth or 12th time frame and is omitted from the intervening five or 11 successive time frames, respectively, without causing appreciable degradation of the interrogation capability of the common control to detect a particular subscriber apparatus for its on-hook off-hook status.

Dial pulse signals represent the numerical value of dial digits, each dialed digit being the number of on-hook intervals in a train of pulses as sent from a subscriber's rotary dial. The pulses from the subscriber's dial are understood to consist of momentary openings of the line which are followed at the switching equipment by a relay or other suitable means. The average dial pulse repetition rate is 10±1 pulses per second (pps). The off-hook time interval between dial pulses is in a range of 36 to 42 milliseconds (ms) or a 58 to 64 per cent break. The interdigital time period or interdigital pause is the time interval from the end of the last on-hook pulse of one digit train to the beginning of the first on-hook pulse of the next digit train. The minimum interdigital pause when pulsing in two step-by-step offices is usually 600 milliseconds.

Dial pulse accumulation is a common phenomenon of telephony and such accumulation in common control telephone switching systems has been accomplished by connecting dial pulse sending data to dial pulse receiver circuits or scanning the inlets of the switching system and recording the pulses by common storage means. Fundamentally, such receiver circuits or point-of-line scan require that spurious or transient line interruptions which represent non-dial pulse signals be eliminated as through the employment of standard filtering or integrating techniques. Obviously, filtering (signal integration) is required in order to eliminate error in dialing patterns. The state of the art receiver circuit utilizes a pulsing relay to integrate a pulsing pattern for a minimum time period by testing the activating current level for the relay. In some telephone systems, magnetic devices are employed to perform signal integration. It is herein proposed to present a completely digital circuit incorporating signal integration features for use as a dial pulse receiver circuit within an automatic common control stored program digital switching equipment known as No. 3 EAX (Electronic Automatic Exchange) manufactured by the assignee or this invention.

A digital dial pulse receiver circuit is disclosed for use as a service access circuit within a digital switching station. The switching station typically is comprised of a number of crosspoint switching matrices or modules interconnected through the operation of highway junctors, a plurality of line group equipment associated with particular switching modules, and a variety of service access circuits such as sender and receiver circuits and tone and announcement circuits interconnected to associated ones of the switching modules. The circuit interconnections of the highway HJ and link junctors LJ and the operations of the sender access circuts are coordinated and controlled by a common control central call processor unit CPU as is commonly known for digital switching equipment. An originating call being processed by the CPU occupies an allocated time slot within the time multiplex data channel format of an incoming T1 carrier trunk line that is connected to a given line group equipment such as incoming time slot IN $TS_X$ being processed through a first incoming group equipment $GE_{IN}$. The CPU selects an available (idle) outgoing trunk line then seizes the same for receiving the data information of the incoming call. CPU seizes the outgoing trunk line through selecting a highway junctor which has idle memory stores in both the incoming time slot IN $TS_X$ and the appropriate outgoing time slot OUT $TS_X$.

A receiving access path (sending access path) is established through the proper crosspoint matrices to an idle dial pulse receiver circuit by the operations of the CPU. The CPU searches for and selects the idle receiver circuit from the group of receiver circuits associated with the crosspoint module which in turn is associated with the incoming trunk line and incoming line group equipment $GE_{IN}$. An idle link junctor serving this group of receiver circuits is simultaneously selected by the CPU, i.e., a link junctor idle in the incoming time slot IN $TS_X$, and the identity of the selected receiver circuit is written into the link junctor. A highway junctor and link junctor are both cyclically read memory devices which pull the crosspoints within the crosspoint matrix and the receiver access matrix, respectively, according to the information stored in the memory banks of the junctors.

It is an object of the present invention to provide a dial pulse receiver circuit configured entirely of digital and logic circuitry.

It is another object of the invention to provide pulse detection and timing for disconnect status to be accomplished by a single counter circuit.

It is still another object to provide pulse detection free of temporary transients to an on-hook condition through the use of digital integration wherein a pulse must exceed a minimum time period before a dial pulse is recognized.

It is a further object of this invention to provide a pair of counter circuits which separately count the number of reoccurring on-hook and off-hook states for the subscriber's line.

It is also an object of the invention to provide a much simplified and economical digital dial pulse receiver circuit which can be dedicated to a call for the duration of the receiving mode.

A dial pulse receiver circuit is connected to a calling party line to receive the supervisory information thereof and comprises a supervisory bit detector circuit for detecting on-hook off-hook conditions of the subscriber's line and generating therefrom corresponding on-hook off-hook output signals, respectively, off-hook and on-hook timer circuits for cumulatively counting during the occurrence of off-hook and on-hook conditions, respectively, and a dial pulse counter circuit for counting the number of dial pulses representative of a dialed digit through counting the times the on-hook timer counts beyond a minimum on-hook pulse duration. The on-hook timer is utilized to provide a disconnect indication to the common control of the switching system. The off-hook timer is utilized to provide a digit ready indication to the common control and the cumulative count of the dial pulse counter is read whereupon all timers of the receiver circuit are reset.

Other objects and advantages of the invention will undoubtedly occur to those skilled in the art as the invention is described in connection with the accompanying drawing in which.

Figures 1, 2:
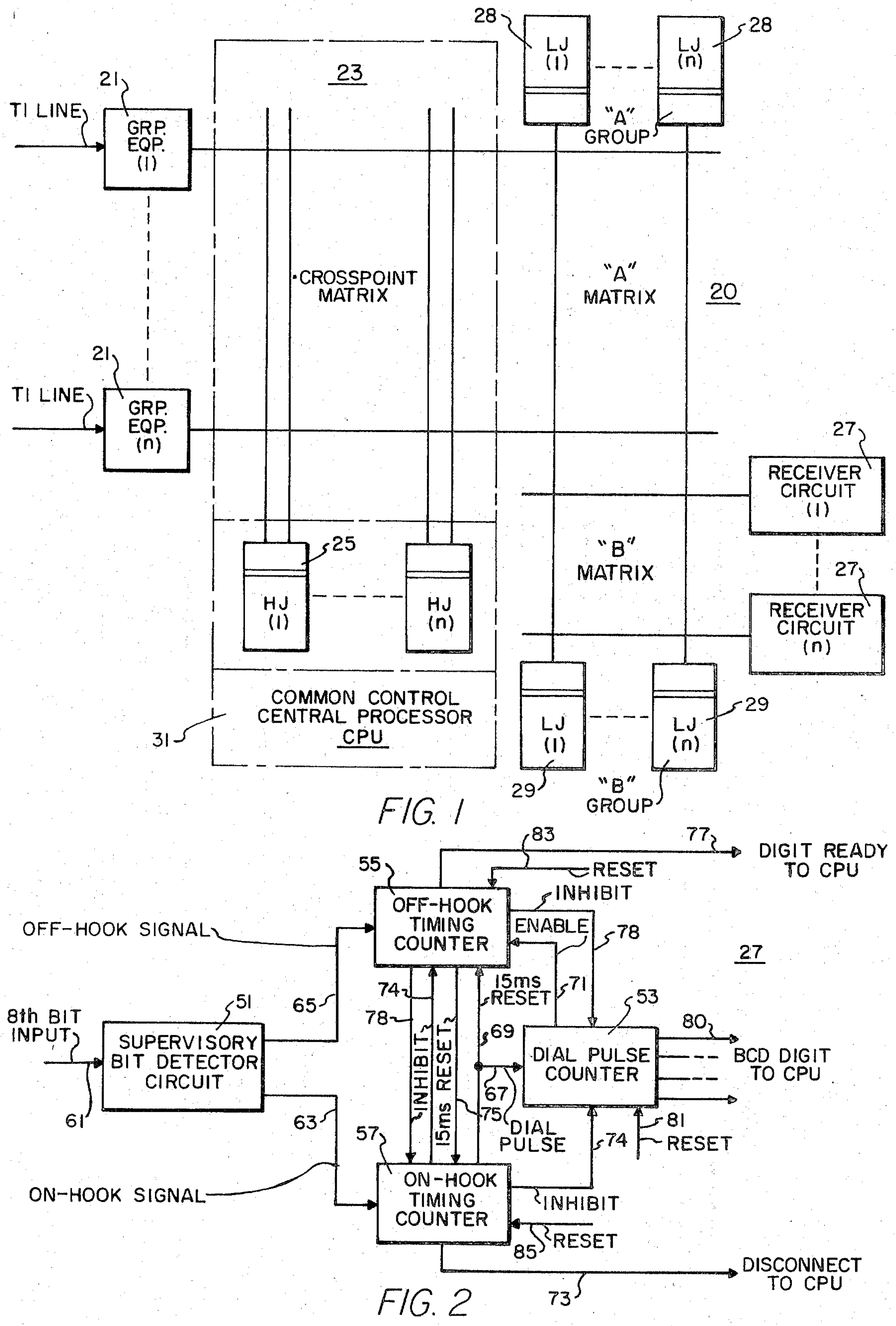
FIG. 1 is a block diagram of a digital type switching station showing a number of individual receiver circuits to be directly connectible to incoming line group equipments by making appropriate crosspoints within service access matrices of cross-points.
FIG. 2 is a block diagram of a receiver circuit in accordance with the present invention.

FIG. 1 discloses a switching station 20 for a telephone communication system, the switching station 20 including a plurality (1 to *n*) of line group equipments 21 linked together through a crosspoint matrix or network 23 by means of a plurality (1 to *n*) of highway junctors (HJ) 25 of the type disclosed in copending application U.S. Ser. No. 258,696 filed June 1, 1972 and assigned to the present assignee. It is shown at 27 a plurality (1 to *n*) of dial pulse receiver circuits which comprise part of the service access equipment for telephone switching station 20. The receiver circuits 27 are connected to the line group equipments 21 by means of service access matrix A having an associated plurality (1 to *n*) of link junctors (LJ) 28 identified as the A group junctors, and also service access matrix B having an associated plurality (1 to *n*) of link junctors (LJ) 29 identified as the B group junctors. Other service access equipment not shown in the drawing but commonly employed with such a telephone communication system are dial pulse sender circuits, multifrequency sender and receiver circuits, tone and announcement circuits and others. It is to be understood that all of the operations of the above equipment are properly coordinated by a common control central processor unit CPU 31.

For the switching station 20 of FIG. 1 only a unidirectional access path need be established across the service matrices to the idle receiver circuit during the receiving mode of a call connection under process. That is to say only eight crosspoint leads need be switched instead of the normal 16 leads. Dial pulse receivers as well as multifrequency receivers are associated with incoming circuits or to a trunk circuit being used in the incoming mode and only incoming information is exchanged from the incoming trunk to the assigned receiver circuit 27. A given incoming trunk is connected to the idle receiver circuit 27 by closing a path through the A and B group junctors during the time slot handling the call. The A matrix of crosspoints in FIG. 1 acts to concentrate the large number of group equipments into a smaller number of receiver buses while the B matrix acts to expand to a larger number of dial pulse receivers. The proper crosspoints in the A and B service access matrices are closed by writing the identity of the proper crosspoints in the respective A and B group link junctors being used. Since the receiver circuit 27 is to receive supervisory information only, only the eighth bit position of a selected channel is connected to the receiver circuit each frame period.

FIG. 1 is illustrative of a very practical access configuration for receiver circuits of both dial pulse and multifrequency MF tone signaling. The number of service buses in the receiver matrices A and B and the number of dial pulse receiver circuits 27 are calculated by the use of well known traffic analyses techniques. The number of trunks simultaneously requesting a receiving operation within a given time slot will determine the number of buses in the receiver matrix. The maximum number of simultaneous time slots available is equivalent to the number of inputs on a given switching matrix module. For example, with an assumed requirement of 6,000 dial pulse trunks (interpreted as a maximum of 6,000 incoming trunks and 6,000 outgoing trunks) and assuming 80 group inputs on four matrix modules such as crosspoint module 23 to comprise the total switching matrix, the number of buses required for the receiver matrices is eleven (11) buses calculated as follows:

80 trunks per time slot simultaneously requesting a receiver;
12 busy hour call attempts per trunk;
12 second holding time per attempt;
Number of receiver buses = (80) (12) (12)/100 = 115.2 CCS.

For a Poisson distribution of 0.001, 115.2 CCS would require 11 receiver matrix buses.

Under the same assumptions as given above and the additional requirement that a receiver circuit be dedicated to a call unit all necessary digits are received or until a disconnect occurs, the number of dial pulse receiver circuits is eighty-six (86) circuits calculated as follows:

1,500 dial pulse trunks contributing traffic per switching module;
12 busy hour call attempts per trunk; and
12 second holding time per attempt;
Number of circuits = (1,500) (12) (12)/100 = 2,160 CCS.

For a Poisson distribution of 0.001, 2,160 CCS would require 86 dial pulse receiver circuits.

Figure 3:
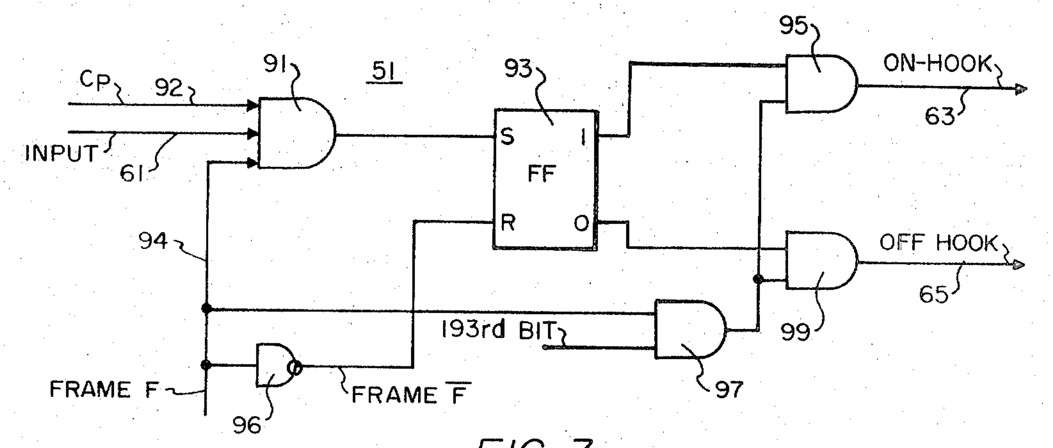
FIG. 3 is a schematic representation of a supervisory bit detector circuit of FIG. 2.
Figure 4:
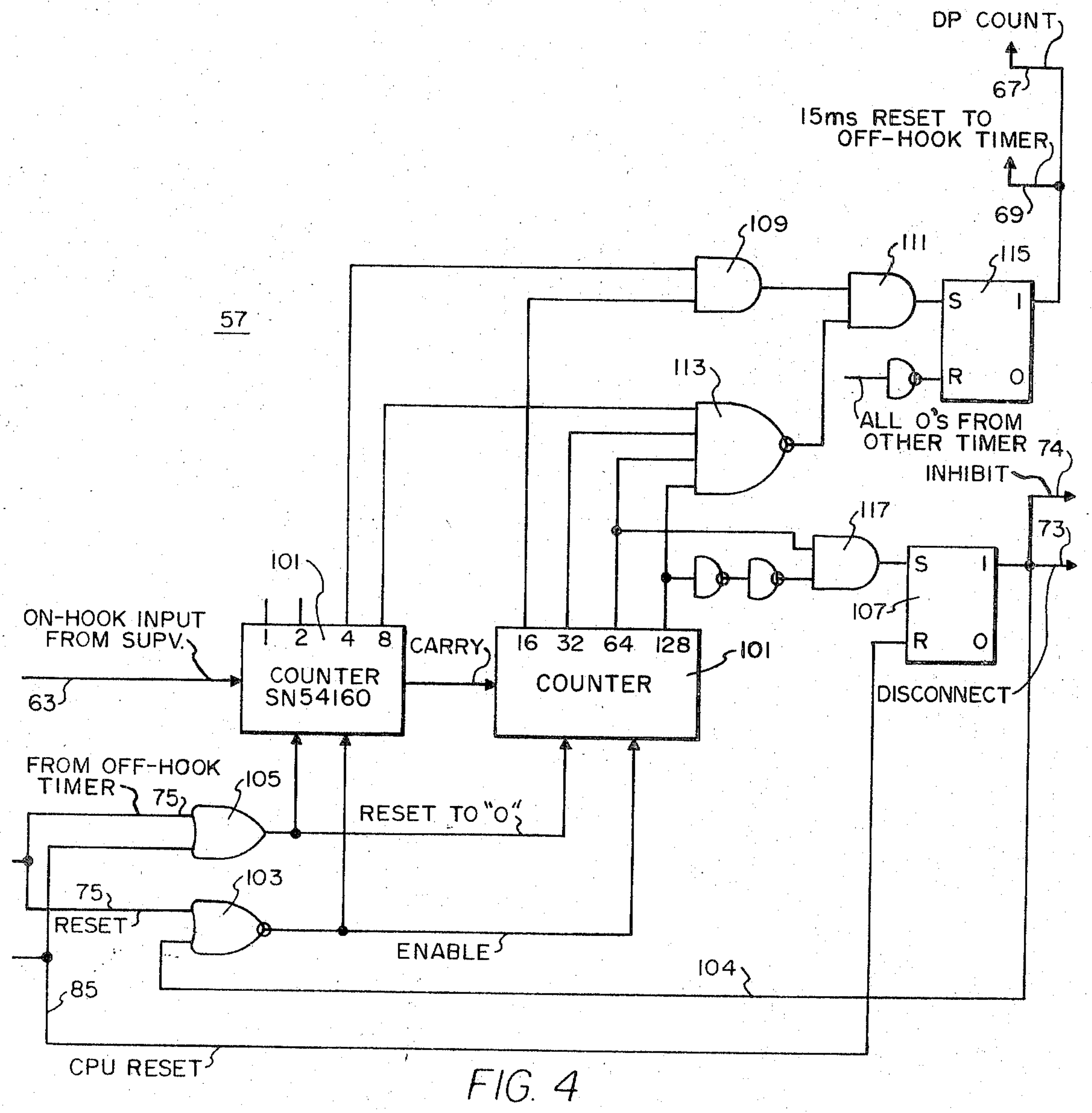
FIG. 4 is a partial block and partial schematic representation of an on-hook timer counter circuit of FIG. 2.
Figure 5:
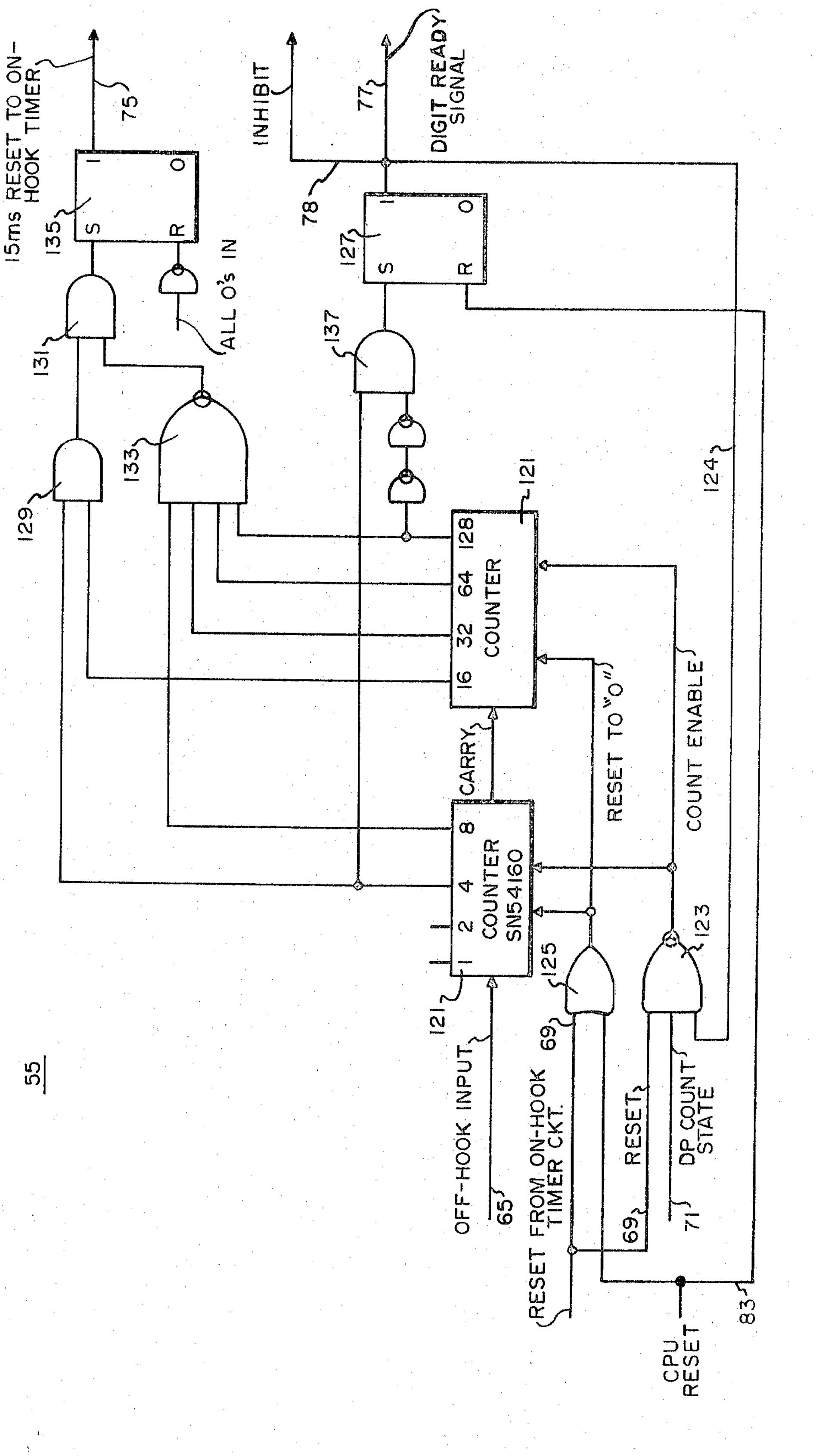
FIG. 5 is a partial block and partial schematic representation of an off-hook timer counter circuit of FIG. 2.

Now in accordance with the invention, a digital dial pulse receiver circuit 27, FIG. 2, is comprised of a supervisory bit detector circuit 51, FIG. 3, for detecting digital supervisory data, a dial pulse counter 53 for providing a dial pulse digit output signal to the CPU 31, an off-hook timing circuit 55, FIG. 5, and an on-hook timing circuit 57, FIG. 4, both providing necessary timing functions. The receiver circuit 27 provides an all digital circuit utilizing incrementing resettable conventional counter circuits such as Motorola, Inc. counter circuits SN54160. The detector circuit 51 is responsive to a logic true on-hook supervisory signal on input lead 61 to provide an on-hook output signal on lead 63, and to a logic not true off-hook supervisory signal on lead 61 to provide an off-hook output signal on lead 65. The on-hook and off-hook output signals on leads 63 and 65 are used to increment the on-hook and off-hook timer circuits 57 and 55, respectively.

Prior to the selection of a particular receiver circuit 27, all of its counters 53, 55 and 57 are set at zero count state. Upon the selection of the receiver circuit 27 through the correct crosspoints, the information stream of a selected line inlet is gated to the input lead 61 thereof. There are initial off-hook signals that precede the first on-hook signals which represent the dial pulses, but such initial off-hook signals do not cause the incrementing of the off-hook timer 55. So long as the dial pulse counter 53 remains at a zero count state, the off-hook timer 55 is disabled from being incremented. When an on-hook signal first occurs, the on-hook timer 57 is incremented and the pulse timing function of the receiver circuit 27 is begun.

In the operation of the receiver circuit 27, the on-hook timer 57 continues to count so long as a true or positive state for the supervisory bit continues to be received by the detector circuit 51. When a stream or plurality of on-hook signals from the detector circuit 51 have caused the on-hook timer 57 to reach a count state of 20 (approximately a 15 millisecond time period), an on-hook pulse comprising one pulse of a dialed digit is said to have been detected. This counting procedure of the on-hook timer 57 is done for the purpose of timing integration so as to eliminate spurious or transient changes in the on-hook off-hook status of the subscriber's line. When the on-hook timer 57 reaches the count of 20, the timer 57 provides an output on lead 67 to increment the count state of the dial pulse counter 53. The output of the on-hook timer 57 is also received on lead 69 by the off-hook timer 55 as a reset pulse known as a 15 millisecond reset. The count state of the dial pulse counter 53 is no longer equal to zero and an enable signal is provided on lead 71 to the off-hook timer 55 for enabling the off-hook timer 55 to count. Thereafter, the timers 55 and 57 continue to count their respective on-hook off-hook pulse signaling states as provided from the detector circuit 51.

Now, if the count state of the on-hook timer 57 increments to a count value of 192, i.e., approximately 140 milliseconds, before the off-hook timer 55 counts to 20 or 15 ms, the on-hook timer 57 will provide on lead 73 a disconnect signal to the CPU 31. The disconnect signal completes the use of the receiver circuit 27 and the on-hook timer 57 will provide an inhibit or disable signal over leads 74 to the dial pulse counter 53 and the off-hook counter 55. The subscriber has gone on-hook and the call terminated. On the other hand, if the count state of the off-hook timer 55 reaches 20 before the count state of the on-hook timer 57 reaches 192, the on-hook timer 57 is reset by a 15 ms reset signal on lead 75 emanating from the off-hook timer 55. The timers 55 and 57 thereafter continue to count, the off-hook timer from the count of 20 and the on-hook timer from a zero count state.

If the off-hook timer 55 should reach a count state of 132, i.e., approximately 100 ms, before the on-hook timer 57 reaches a count state of 20, the off-hook timer 55 provides a digit ready signal on lead 77 to the CPU 31 and inhibit signal over leads 78 to the dial pulse counter 53 and to the on-hook counter 57. If, however, the on-hook timer 57 should reach a count state of 20 before the off-hook timer 55 accumulates a count state of 132, the 15 ms reset signal on lead 69 is again provided to reset the off-hook timer 55 and the dial pulse counter 53 is again incremented. The above-described procedure is repeated until either the digit ready signal or the disconnect signal is given and the counting operation of the receiver circuit 27 inhibited. Irregardless of which of these signals is produced, the CPU 31 is preconditioned or programmed to read or accept the aggregate on-hook pulse count on the detector circuit 53 before the receiver circuit 27 can again be utilized to receive dial pulses. The accumulated count value of the dial pulse counter 53 is conveniently provided in the form of a bcd parallel output digit at 80 in FIG. 2. The CPU 31 then provides reset signals, indicated at 81, 83 and 85 in FIG. 2, to the counters 53, 55 and 57, respectively, and the receiver circuit 27 is prepared to accept the next digit of the called number or a new call if a final digit has been received. A determination of the presence of a final digit is made by the CPU 31 and the means therefor is not disclosed as a part of the receiver circuit 27.

FIG. 3 discloses the circuitry of the supervisory bit detector circuit 51. A 3-input logic AND gate 91 receives supervisory information from a connected line inlet highway on the input lead 61, system clock pulse CP signals on lead 92 provided from the CPU 31 at the standard 1.544 megabit rate and framing information F on lead 94. The framing data is in digital format and is positive throughout the duration of the supervisory frame but during the presence of non-supervisory frames is a negative signal. The receiver circuit 27 is dedicated to a given line inlet until dialing is complete or terminated. The AND gate 91 is enabled for one channel within the supervisory frame, that channel corresponding to the channel handling the call being made. The enablement of the gate 91 operates to set a standard bistable flip-flop circuit 93 and supply a positive signal to a 2-input AND gate 95. With the occurrence of the 193rd bit position of the supervisory frame, another 2-input AND gate 97 is enabled and the gate 95 provides a positive signal on the on-hook output lead 63 causing the on-hook timer 57 to increment by one count. The flip-flop circuit 93 is normally reset due to the provision of an inverter gate 96 and the fact that the framing signal is negative during any non-supervisory frame. Therefore, when the supervisory data on input lead 61 is negative indicating an off-hook status for the calling party, the flip-flop circuit 93 remains reset; the occurrence of the 193rd bit position of the supervisory frame results in the enabling of a 2-input AND gate 99 to release a positive signal on the off-hook output lead 65. This off-hook signal from the detector circuit 51 increases the count of the off-hook timer 55 by one count.

FIG. 4 shows the detailed circuitry of the on-hook timer circuit 57 wherein counter circuit means 101 such as an integrated 8 bit counter circuit of the aforementioned Motorola SN54160 type capable of counting to a count state of at least 192, receives on-hook pulses on the lead 63. The counter 101 is enabled to count so long as both inputs of a logic NOR gate 103 remain negative. The two input signals to the gate 103, as shown in FIG. 4, are the 15 ms reset signal from the off-hook timer 55 on the lead 75 and the disconnect output signal from the on-hook timer 57 fed back to the gate 103 by lead 104. The receipt of the 15 ms reset signal from the off-hook timer 55 on the lead 75 provides a reset signal to the counter 101 through an OR gate 105 and a disablement to the counter 101 through means of the gate 103. The receipt of the abovementioned CPU reset on the lead 85 provides through the gate 105 necessary reset which accompanies a digit being read from the dial pulse counter 53. The CPU reset is also utilized to reset a standard bistable flip-flop circuit 107 which comprises the output circuit for the disconnect signal to the CPU 31 on lead 73 and the inhibit signal on lead 74.

In the operation of the on-hook timer 57, as a count of 20 is reached, an AND gate 109 is enabled and a positive signal is provided to a following AND gate 111. So long as all inputs to a NOR gate 113 remain negative or zero, the gate 111 is then enabled to set a standard bistable flip-flop circuit 115 which comprises the outer circuit for incrementing the dial pulse counter on the lead 67 and providing the 15 ms reset signal to the off-hook timer 55 on the lead 69. When the counter circuit 101 reaches a count value of 192, it is seen that an AND gate 117 is enabled, the flip-flop 107 set and the disconnect signal is provided. An all zero count state for the counter circuit of the off-hook timer 55 is used to reset the flip-flop 115.

FIG. 5 shows the detailed circuitry of the off-hook timer circuit 55 wherein counter circuit means 121 such as the Motorola SN54160 counter receives off-hook pulses on the lead 65. The counter 121 is enabled to count so long as all inputs to a 3-input logic NOR gate 123 remain negative. The three input signals to the gate 123 are the 15 ms reset signal from the on-hook timer 57 on the lead 69, the enable signal from the dial pulse counter 53 on the lead 71 and the digit-ready output signal fed back to the gate 123 by a lead 124. The receipt of the 15 ms reset signal from the on-hook timer 57 on lead 69 provides a reset signal to the counter 121 through an OR gate 125 and a disablement to the counter 121 through means of the gate 123. The CPU reset signal on the lead 83 provides through the gate 125 the necessary reset which accompanies a digit being read from the dial pulse counter 53. The CPU reset is further utilized to reset a standard bistable flip-flop circuit 127 which comprises the output circuit for the digit-ready signal to the CPU 31 on lead 77 and the inhibit signal on lead 78. As a count of 20 is reached by the counter circuit 121, an AND gate 129 is enabled and a positive signal is provided to a following AND gate 131. So long as all inputs to a NOR gate 133 remain negative or zero, the gate 131 is enabled to set a standard bistable flip-flop circuit 135 which comprises the output circuit for providing the 15 ms reset signal to the on-hook timer 57 on the lead 75. When the counter circuit 121 reaches a count state of 132, it is seen that an AND gate 137 is enabled, the flip-flop 127 is set and the digit-ready signal is provided. An all zero count state for the counter circuit 101 of the on-hook timer 57 is used to reset the flip-flop 135.

The quiescent state of the input to the receiver circuit 27 is off-hook. The timing for the interdigital pause and the reading of the digit from the dial pulse counter 53 is controlled within the CPU 31 and is not discussed herein. However, for the particular embodiment of the receiver circuit 27, the CPU 31 must collect the digit at least 15 ms before the end of the first pulse of the next sequential digit. The interdigital pause is designed to be 100 ms with less than a 15 ms period of being on-hook occurring during the interdigital pause, and the duration of the disconnect flag is 140 ms with less than 15 ms of on-hook occurring. Of course, during pulsing a calling party can for some reason discontinue the dialing operation without completing a full dialing pattern. This presents a permanent condition to the CPU 31 which must be timed so as to determine the termination of the receiving mode. The CPU 31 provides this timing function. The detailed circuitry for the dial pulse counter 53 has not been shown since the showing thereof would be merely redundant and tend to unduly lengthen the detailed description since the dial pulse counter is also of the Motorola SN54160 type counter circuit.

The invention has been described in detail with particular reference to the drawing, but it will be understood by those skilled in the pertinent art that various modifications and changes can be effected without departing from the spirit and scope of the present invention.

What is claimed is:

1. A digital dial pulse receiver circuit for use with switching exchanges of telephone communication systems comprising pulse detecting means for detecting the on-hook off-hook supervisory state of a calling party line and generating on-hook off-hook pulses corresponding thereto, respectively, first counter means incrementable by said on-hook pulses and providing therefrom first output signals responsive to the occurrences of said first counter means attaining a lower preselected count state and a second output signal responsive to said first counter means attaining a higher preselected count state, second counter means incrementable by said off-hook pulses and providing therefrom first output signals responsive to the occurrences of said second counter means attaining a lower preselected count state and a second output signal responsive to said second counter means attaining a higher preselected count state, said first and second counter means being resettable by said first output signals from said second counter means and said first output signals from said first counter means, respectively, third counter means incrementable by said first output signals of said first counter means, the accumulated count state thereof being representative of the numerical value of a dialed digit, said second output signal of said first counter means being effective to signal a calling party disconnect condition and said second output signal of said second counter means being effective to signal the completion of a dialed digit.

2. A digital dial pulse receiver circuit as claimed in claim 1 wherein said pulse detecting means includes input gating means enabled by an on-hook condition of said calling party line occurring during a carrier channel of a supervisory frame of a transmitted time frame data format, latching means set from one state to another state with the enablement of said input gating means and reset during a non-supervisory frame of said data format from said other state to said one state, and output gating means enabled during a final channel of said supervisory frame to provide off-hook and on-hook signals corresponding to said latching means being set during said final channel to said one state and said other state, respectively.

3. A digital dial pulse receiver circuit as claimed in claim 1 wherein said lower preselected count states of said first and second counter means are equal.

4. A digital dial pulse receiver circuit as claimed in claim 3 wherein said higher preselected count state of said first counter means is of a greater count value than said higher preselected count state of said second counter means.

5. A digital dial pulse receiver circuit as claimed in claim 1 wherein said first counter means comprises digital integration means for cancelling transient on-hook pulses which endure on said calling party line for less than a minimum selected time period corresponding to said lower count state, said digital integration means including a counter circuit having a plurality of count state outputs and logic gating means gated to receive predetermined ones of said plurality of count state outputs representative of said lower count state and being effective to provide said first output signals therefrom upon the occurrences of said lower count state, respectively.

6. A digital dial pulse receiver circuit as claimed in claim 5 wherein said first and second counter means include respective latching means settable to an inactive latching state by all zero count states of the second and first counter means, respectively, to prevent the occurrences of said first output signals thereof.

7. A digital dial pulse receiver circuit as claimed in claim 5 wherein said second output signals of said first and second counter means are effective to inhibit for a predetermined time any further incrementing of count states of said second and first counter means, respectively, through continued occurrences of said off-hook and on-hook pulses, respectively.

8. A device for the reception of on-hook off-hook pulses from a calling party line to formulate dialed digits therefrom comprising pulse detecting means for detecting the on-hook off-hook supervisory state of a calling party line during a carrier channel of a supervisory frame of a transmitted time frame format and generating on-hook off-hook pulses corresponding thereto, respectively, first counter means incrementable by said on-hook pulses and providing therefrom first output signals responsive to the occurrences of said first counter means attaining a lower preselected count state and a second output signal responsive to said first counter means attaining a higher preselected count state, second counter means incrementable by said off-hook pulses and providing therefrom first output signals responsive to the occurrences of said second counter means attaining a lower preselected count state and a second output signal responsive to said second counter means attaining a higher preselected count state, said first and second counter means being resettable by said first output signals from said second counter means and said first output signals from said first counter means, respectively, third counter means incrementable by said first output signals of said first counter means, the accumulated count state thereof being representative of the numerical value of a dialed digit.

* * * * *